(12) United States Patent
Tennant et al.

(10) Patent No.: US 10,534,110 B2
(45) Date of Patent: Jan. 14, 2020

(54) INTEGRATED PHOTONICS DEVICE FOR CONTINUOUS PHASE-CONTROLLED ACTIVE BEAM STEERING AND FORMING

(71) Applicant: PRECISION OPTICAL TRANSCEIVERS INC., Rochester, NY (US)

(72) Inventors: Bryce Tennant, Rochester, NY (US); Donald Adams, Rochester, NY (US)

(73) Assignee: PRECISION OPTICAL TRANSCEIVERS INC., Rochester, NY (US)

( * ) Notice: Subject to any disclaimer, the term of this patent is extended or adjusted under 35 U.S.C. 154(b) by 43 days.

(21) Appl. No.: 15/865,779

(22) Filed: Jan. 9, 2018

(65) Prior Publication Data
US 2019/0212472 A1    Jul. 11, 2019

(51) Int. Cl.
*H04B 10/00* (2013.01)
*G02B 1/00* (2006.01)
(Continued)

(52) U.S. Cl.
CPC .............. *G02B 1/005* (2013.01); *G02B 5/28* (2013.01); *G02B 6/1225* (2013.01); *G02B 6/354* (2013.01); *G02B 6/3526* (2013.01); *G02F 1/3136* (2013.01); *H01Q 3/2676* (2013.01); *H01Q 5/22* (2015.01); *H04Q 11/0003* (2013.01)

(58) Field of Classification Search
CPC .......... H04B 10/2575; H04B 10/25752; H04B 10/25753; H01Q 3/2682; H01Q 3/2676; H01Q 21/22; H01Q 21/24

USPC ........ 398/115, 116, 117, 141, 158, 159, 162, 398/188, 135, 136, 137, 138, 139, 201,
(Continued)

(56) References Cited

U.S. PATENT DOCUMENTS

| 4,739,334 A | 4/1988 | Soref |
| 4,885,589 A | 12/1989 | Edward et al. |

(Continued)

OTHER PUBLICATIONS

Chang, Chia-Ming, et al., "High-power dual-fed traveling wave photodetector circuits in silicon photonics," Aug. 24, 2015, vol. 23, No. 17, DOI: 10.1364/OE.23.022857, Optics Express 22857.
(Continued)

*Primary Examiner* — Hanh Phan
(74) *Attorney, Agent, or Firm* — Fox Rothschild LLP; Robert J. Sacco

(57) ABSTRACT

An RF transmit signal is modulated onto an optical carrier to form a transmit modulated optical carrier (TMOC). The TMOC is split into N transmit modulated optical subcarriers (TMOS). Each TMOS is respectively processed in one of N transmit optical channels (TOCs). In each TOC, RF antenna beam steering operations are performed by optical tuning the TMOS to selectively control a phase difference between the optical carrier and the optical sideband. A different selected phase difference can be applied in each TOC. The TMOS from each of the N TOCs is then processed to obtain N RF signals for driving an antenna array. In the receive direction, M received RF signals from M antenna elements are modulated respectively onto M optical subcarriers to form M receive modulated optical subcarriers (RMOS). RF antenna beam steering operations are performed by optical tuning the RMOS.

25 Claims, 7 Drawing Sheets

(51) Int. Cl.
*G02F 1/313* (2006.01)
*G02B 6/35* (2006.01)
*G02B 6/122* (2006.01)
*H04Q 11/00* (2006.01)
*G02B 5/28* (2006.01)
*H01Q 5/22* (2015.01)
*H01Q 3/26* (2006.01)

(58) Field of Classification Search
USPC ...... 398/187, 186, 66, 68, 72; 342/375, 368, 342/373, 372, 374
See application file for complete search history.

(56) References Cited

U.S. PATENT DOCUMENTS

| | | | |
|---|---|---|---|
| 5,117,239 A | 5/1992 | Riza | |
| 5,333,000 A | 7/1994 | Hietala et al. | |
| 5,751,242 A | 5/1998 | Goutzoulis et al. | |
| 5,867,295 A | 2/1999 | Betts | |
| 6,229,482 B1 | 5/2001 | Vaughan | |
| 6,836,515 B1 | 12/2004 | Kay et al. | |
| 7,446,696 B2 * | 11/2008 | Kondo | G01S 7/35 180/167 |
| 7,545,868 B2 | 6/2009 | Kennedy et al. | |
| 7,724,179 B2 | 5/2010 | Williams et al. | |
| 8,180,183 B1 | 5/2012 | Yap | |
| 9,070,972 B2 | 6/2015 | Wang et al. | |
| 9,525,489 B2 | 12/2016 | Schuetz et al. | |
| 9,614,280 B2 | 4/2017 | Shi et al. | |
| 9,831,901 B2 | 11/2017 | Kpodzo et al. | |
| 10,103,823 B1 | 10/2018 | Kyrolainen et al. | |
| 10,312,999 B2 * | 6/2019 | Neuman | H04B 7/18515 |
| 2003/0090777 A1 | 5/2003 | Yap | |
| 2004/0208636 A1 | 10/2004 | Reynolds et al. | |
| 2006/0067709 A1 | 3/2006 | Newberg et al. | |
| 2007/0280704 A1 | 12/2007 | Fitzgerald et al. | |
| 2008/0225375 A1 | 9/2008 | Newberg et al. | |
| 2009/0067772 A1 * | 3/2009 | Khurgin | H01Q 3/2676 385/3 |
| 2009/0110398 A1 | 4/2009 | Pfeiffer | |
| 2009/0263144 A1 | 10/2009 | McKinney | |
| 2011/0038632 A1 | 2/2011 | Zou | |
| 2012/0070151 A1 | 3/2012 | Shin et al. | |
| 2012/0189308 A1 | 7/2012 | Watanabe | |
| 2013/0202308 A1 * | 8/2013 | Middleton | H01Q 3/2676 398/116 |
| 2014/0126914 A1 | 5/2014 | Berlin et al. | |
| 2015/0349892 A1 | 12/2015 | Fischer et al. | |
| 2017/0207531 A1 | 7/2017 | Murakowski | |
| 2018/0091335 A1 | 3/2018 | Schnizler | |
| 2018/0102847 A1 * | 4/2018 | Kim | H04B 10/501 |
| 2019/0212472 A1 | 7/2019 | Tennant et al. | |
| 2019/0222320 A1 | 7/2019 | Calhoun et al. | |

OTHER PUBLICATIONS

Beling, A., et al., "InP-based waveguide photodiodes heterogeneously integrated on silicon-on-insulator for photonic microwave generation," Nov. 4, 2013, vol. 21, No. 22, DOI: 10.1364/OE.21.025901, Optics Express 25901.

Righini, G.C., et al., "Glass Optical Waveguides: A Review of Fabrication Techniques," Optical Engineering 53(7), 071819 (Jul. 2014).

Longbrake, M., "True Time-Delay Beamsteering for Radar," Wright State University, Air Force Research Laboratory Sensors Directorate, Dayton, OH, 2012 IEEE National Aerospaceand Electronics Conference (NAECON), Jul. 2012.

* cited by examiner

INTEGRATED PHOTONICS DEVICE FOR CONTINUOUS PHASE-CONTROLLED ACTIVE BEAM STEERING AND FORMING

BACKGROUND

Statement of the Technical Field

This document concerns photonic devices, and more particularly concerns photonic devices which facilitate active beam steering and forming in a radio frequency system.

Description of the Related Art

As the demand for communication bandwidth continues to increase, many wireless providers are turning towards higher frequency carriers: microwave (3-30 GHz) or millimeter wave (30-300 GHz). However these higher frequency carriers suffer from greater free-space propagation loss. To mitigate these effects constructive interference between a plurality of antenna elements can be used to focus the electro-magnetic radiation in one direction and thus increase an amount of antenna gain achieved in a particular direction. Such systems are sometimes referred to as phased array antenna systems, or more simply as "phased arrays."

Still, the design and implementation of phased array antenna systems is complex and involves many challenges. Among the most significant of such challenges is the need to control the amplitude and phase of signals associated with each of the plurality of antenna elements. Such control is essential in order to generate the desired antenna gain pattern for the composite array. Various designers have adopted different approaches to facilitate such control. For example, some systems utilize RF electronics in the signal path for each antenna channel, whereas other systems adopt all digital control of the signals. Still other systems utilize a hybrid approach.

SUMMARY

The disclosure concerns a method for facilitating control of a phased array antenna system. An RF transmit signal is modulated onto an optical carrier to form a transmit modulated optical carrier (TMOC) which includes the optical carrier and an optical sideband. Thereafter, the TMOC is split into N transmit modulated optical subcarriers (TMOS), where N is an integer value greater than 1. Each TMOS is respectively processed in one of N transmit optical channels (TOCs). In each TOC, RF antenna beam forming operations are performed by optical tuning of the TMOS. As used herein, beam forming can include both beam shaping and beam steering. Optical tuning of the TMOS can involve selectively controlling a phase difference between the optical carrier and the optical sideband. A different selected phase difference can be applied in each TOC. The TMOS from each of the N TOCs is then processed to obtain N RF signals, each having a controlled phase attribute as a result of the optical tuning. In particular, each TMOS can be communicated to a photodetector provided in the TOC, which receives the TMOS and extracts from it one of the N RF signals. The N RF signals are then respectively communicated to N antenna elements which comprise an antenna array. The phase adjustment that is applied to each TMOS is selectively coordinated by a control processor so as to control a boresight direction of a composite antenna transmit beam produced by the N antenna elements when excited by the N RF signals.

The method can further involve performing RF antenna beam shaping operations in each TOC by optically tuning the TMOS to selectively control an amplitude of the RF signal applied to each of the N antenna elements. A different selected amplitude adjustment can be applied in each TOC. The TMOS from each of the N TOCs is then processed using a photodetector as described above to obtain the N RF signals, each having a controlled phase attribute and a controlled amplitude as a result of the optical tuning. The N RF signals are then respectively communicated to N antenna elements which comprise an antenna array.

According to one aspect, the phase difference between the optical carrier and the optical sideband of each TMOS signal is controlled in the TOC using a phase control ring. To extend the range of control, each TMOS can be further controlled in the TOC using a switchable delay element.

In the receive direction, the method can involve modulating M received RF signals from M antenna elements respectively onto M optical subcarriers. In some scenarios, each of the subcarriers can be derived from the same source carrier such that all of the optical subcarriers are identical (at least prior to applying modulation). However, embodiments are not so limited and in other scenarios, different optical subcarriers can be used (e.g. different optical subcarriers having different wavelengths). The result is M receive modulated optical subcarriers (RMOS), each comprised of a receive optical subcarrier signal and a receive optical sideband signal. Each of the RMOS is respectively processed in a corresponding one of M receive optical channels (ROCs). In each ROC, RF receive antenna beam forming (including beam shaping and beam steering operations) are performed by optical tuning the RMOS.

Beam steering involves selectively controlling a phase difference as between the receive optical carrier signal and the receive optical sideband signal. The phase difference applied in each ROC can be different. As in the transmit process, beam steering control can be facilitated by a combination of a phase control ring and a switchable delay element. Similarly, the RF antenna beam shaping operations in the receive direction can involve optically tuning the RMOS to selectively control an amplitude of each RMOS. The receive process can further involve adjusting a phase of the receive optical subcarrier signal in each of the M ROCs so as to match a phase of the receive optical subcarrier signal in each other of the M ROC. The M RMOS are then optically combined to form a receive modulated optical carrier (RMOC).

The RMOC resulting from the combining process is communicated to a photodetector to extract a combined receive RF signal. Notably, the phase difference that is applied in each of the M RMOS is selectively coordinated by a control processor so as to control a boresight direction of a composite antenna receive beam produced by the N antenna elements.

This disclosure also concerns a beam steering system. The system includes a control processor and a transmit path module (TPM). The TPM is configured for receiving as an input a transmit modulated optical carrier (TMOC) comprised of an optical carrier and an RF modulated optical sideband. The TPM includes an optical splitter in which the TMOC is split into N transmit modulated optical subcarriers (TMOS), where N is an integer value greater than 1. The TPM also includes a plurality of N transmit optical channels (TOCs), each respectively including certain optical tuning component. These optical tuning components associated with a particular TOC are configured to facilitate optical tuning one of the N TMOS. The purpose of such optical tuning includes selectively controlling a phase difference between the optical carrier and the RF modulated optical sideband comprising the TMOS.

Each TOC of the beam steering system also includes a photodetector which is configured to extract from the TMOS an RF subcarrier signal. Notably, the signal phase of each RF subcarrier signal will have been selectively modified by the optical tuning process described herein. The control processor is configured to selectively independently control the phase difference applied to the TMOS in each of the N TOCs. This allows the control processor to coordinate antenna beam steering when the plurality of the RF subcarrier signals are subsequently communicated to antenna elements comprising an antenna array.

In the beam steering system, at least one of the optical tuning elements in each TOC can also be configured to selectively control an amplitude of the TMOS. In such scenarios, the control processor is further configured to selectively independently control the amplitude of each TMOS to coordinate antenna beam shaping.

The beam steering system also includes a receive path module (RPM). The RPM is comprised of M receive optical channels (ROCS). Each ROC configured for receiving as an input a receive RF signal from a corresponding one of M receive antenna element of an antenna array, and where M is an integer greater than 1. Each ROC is comprised of an optical modulator. The optical modulator is configured to modulate the receive RF signal onto a receive optical carrier to form a receive modulated optical subcarrier (RMOS). The RMOS is comprised of an optical carrier and an RF modulated optical sideband.

Each ROC also includes a plurality of optical tuning elements. The optical tuning elements are configured to optical tune the RMOS so as to selectively control a phase difference between the optical carrier and the RF modulated optical sideband comprising the RMOS. The ROC will also advantageously include a phase matching element. The phase matching element is configured to facilitate a phase match of the optical carrier of the RMOS to each other of the M RMOS. The RPM is further comprised of an optical combiner coupled to each ROC and configured to combine the M RMOS and thereby produce a single receive modulated optical carrier (RMOC) as an output.

The beam steering system includes a photodetector configured to receive the RMOC as an input and extract from the RMOC an RF signal. The control processor is configured to selectively independently control the phase difference applied in each of the M ROC to coordinate receive beam antenna steering.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
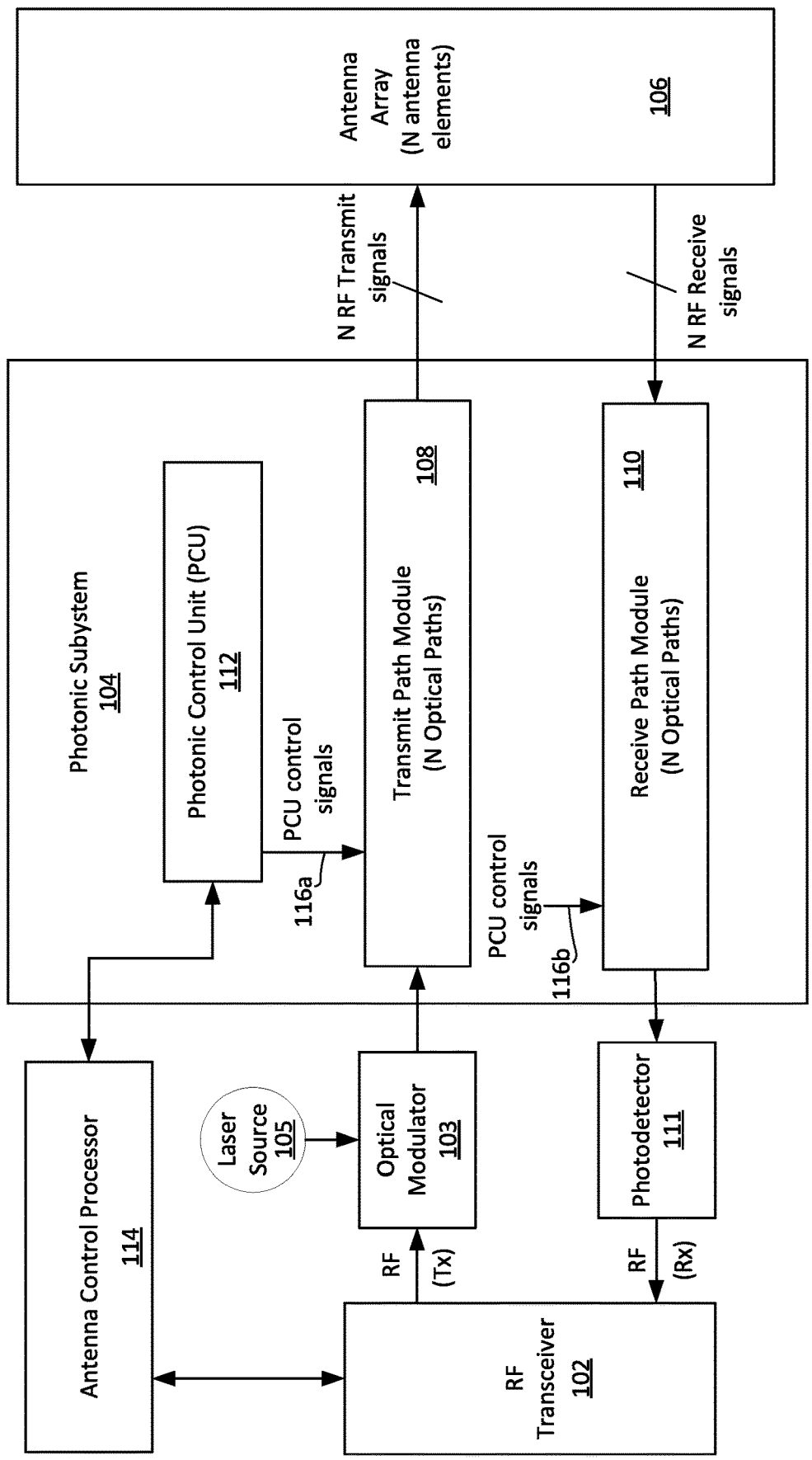
FIG. 1 is a block diagram which is useful for understanding how an integrated photonics subsystem can be used for continuous phase-controlled active beam steering and beam shaping in an RF communication system.

It will be readily understood that the components of the embodiments as generally described herein and illustrated in the appended figures could be arranged and designed in a wide variety of different configurations. Thus, the following more detailed description of various embodiments, and as represented in the figures, is not intended to limit the scope of the present disclosure, but is merely representative of various embodiments. While the various aspects of the embodiments are presented in drawings, the drawings are not necessarily drawn to scale unless specifically indicated.

A phased array antenna system uses a plurality of individual radio frequency (RF) antenna elements, each spaced a predetermined distance from each other. The number of elements can be as few as two, but an phased array antenna can be comprised of hundreds or even thousands of such antenna elements. A phased array antenna system allows both the shape and the direction of the beam to be electronically varied by carefully controlling the phase and amplitude of RF signals communicated to each of the antenna elements forming the array. A conventional approach for accomplishing this result often involves electronic phase shifters and variable gain elements in each channel used to communicate RF energy to respective antenna element forming the array.

In phased array systems, a direction of an antenna beam produced by the phased array is varied by controlling a phase shift applied to each RF signal which is communicated to and from a respective antenna element. Amplitude control is also important in such systems. Selective control over signal amplitude in each channel associated with an antenna element can be useful for suppressing antenna sidelobe levels.

From the foregoing it will be appreciated that phased array beamforming operations can require very accurate control over amplitude and phase of RF signals which are transmitted using the array of antenna elements. Likewise a similar degree of control over amplitude and phase is necessary for beamforming in the receive direction when signals are received by the plurality of antenna elements comprising the antenna array. But the phase and amplitude control components necessary for these operations can consume significant amounts of power. They can also introduce loss into a transmit and/or receive signal path that is undesirable in a high performance communication system. Also, as systems migrate to increasingly higher RF transmit and receive frequencies, it can be challenging to ensure sufficient granularity with respect to phase control.

To overcome these and other limitations, there is disclosed herein a hybrid approach to phased array antenna control that employs a photonic system. The photonic system is used to couple RF signal information to and/or from a plurality of antenna elements that form an array (e.g., a phased array). RF signals communicated to and from the antenna elements are modulated onto optical carriers for transport. Thereafter, phase and gain adjustments are performed for RF signals associated with each antenna element as part of the optical processing handled in the photonic system.

An advantage of the arrangements disclosed herein, is that a photodiode array which converts optical signals to RF signals is disposed directly at the location of the antenna elements which comprising the array. This arrangement is especially advantageous in systems involving arrays having large numbers of antenna elements, and minimizes transmission line impedance matching issues. For example, the system facilitates electrical interfaces which are extremely short when considered in terms of RF wavelength. Signal information is pushed optically from a remote transceiver site, all the way to the actual antenna element. Once arrived at the antenna element, the optical signal is converted to RF and then communicated directly to a respective antenna element. A similar approach is used in the receive direction.

Shown in FIG. 1 is a simplified block diagram which is useful for understanding certain aspects of an illustrative system employing such an approach. The system 100 includes an RF transceiver 102, an optical modulator 103, a laser source 105, a photodetector 111, a photonic sub-system 104 and an antenna array 110. The RF transceiver can be a conventional transceiver unit that is capable of transmit and receive operations within a predetermined frequency range. In some scenarios the RF transceiver can be configured for communicating digital data or symbols using RF signals having a conventional RF modulation scheme. For example, the RF signals transmitted and/or received by the RF transceiver can involve the use of amplitude shift keying (ASK), frequency shift keying (FSK), and/or phase shift keying (PSK), without limitation.

The optical modulator 103 is an electro-optical conversion device which modulates an RF transmit signal from the transceiver 102 onto an optical carrier and provides the resulting transmit modulated optical carrier (TMOC) signal to the photonic module 104. The optical modulator can make use of an electro-optic effect such that an RF signal (e.g., a modulated RF signal) can be imposed on the phase, frequency, and/or amplitude of the optical beam. Optical modulators are well-known and therefore will not be described here in detail. However, it should be understood that an electro-optic effect used to facilitate such modulation can be a change or modification of a refractive index associated with an optical waveguide. In some scenarios, an optical waveguide in the optical modulator can be comprised of a material such as lithium niobate, which is known to have a refractive index that varies in the presence of an electric field.

The modulated optical carrier signal produced as a result of the optical modulation described herein will include both the original optical carrier and an optical sideband signal produced as a result of the modulation process. As is known, the optical sideband signal will be offset in frequency as compared to the original optical carrier. The combination of the optical carrier and the sideband signal are sometimes collectively referred to herein as a modulated optical carrier signal.

The photodetector 111 is an optical to electrical (opto-electrical) signal conversion device. The photodetector receives a modulated optical carrier signal from the photonic module 104, and extracts or demodulates from the modulated optical carrier signal an RF receive signal. Photodetectors are discussed below in greater detail. However, it should be appreciated that the exact type of optical modulator/photodetector used is not critical provided that it is suitable for optically encoding/decoding the RF signals communicated to and from the RF transceiver system.

The antenna array 110 is comprised of a plurality of antenna elements (not shown in FIG. 1). For example, the array can comprise N antenna element, where N is a whole number greater than 1. As such, the antenna array is capable of forming an electronically steerable antenna beam if the phase and amplitude of RF signals communicated to and from the antenna array are properly controlled. Antenna systems of this type are well-known in the art and are sometimes referred to as phased arrays.

The photonic subsystem 104 is comprised of a transmit path module (TPM) 108 and a receive path module (RPM) 110. The photonic subsystem also includes a photonic control unit (PCU) 112. Each of the TPM 108 and the RPM 110 is comprised of a plurality of optical channels (not shown in FIG. 1). In some scenarios, the number of optical channels in each of the TPM 108 and the RPM 110 can be matched to the number of antenna elements in the antenna array 106. Accordingly, if the antenna array 106 is comprised of N antenna elements, then the TPM 108 and the RPM 110 can each comprise N optical channels. Additional detail concerning the TPM 108 and RPM 110, including their purpose and function, is provided below.

Figure 2:
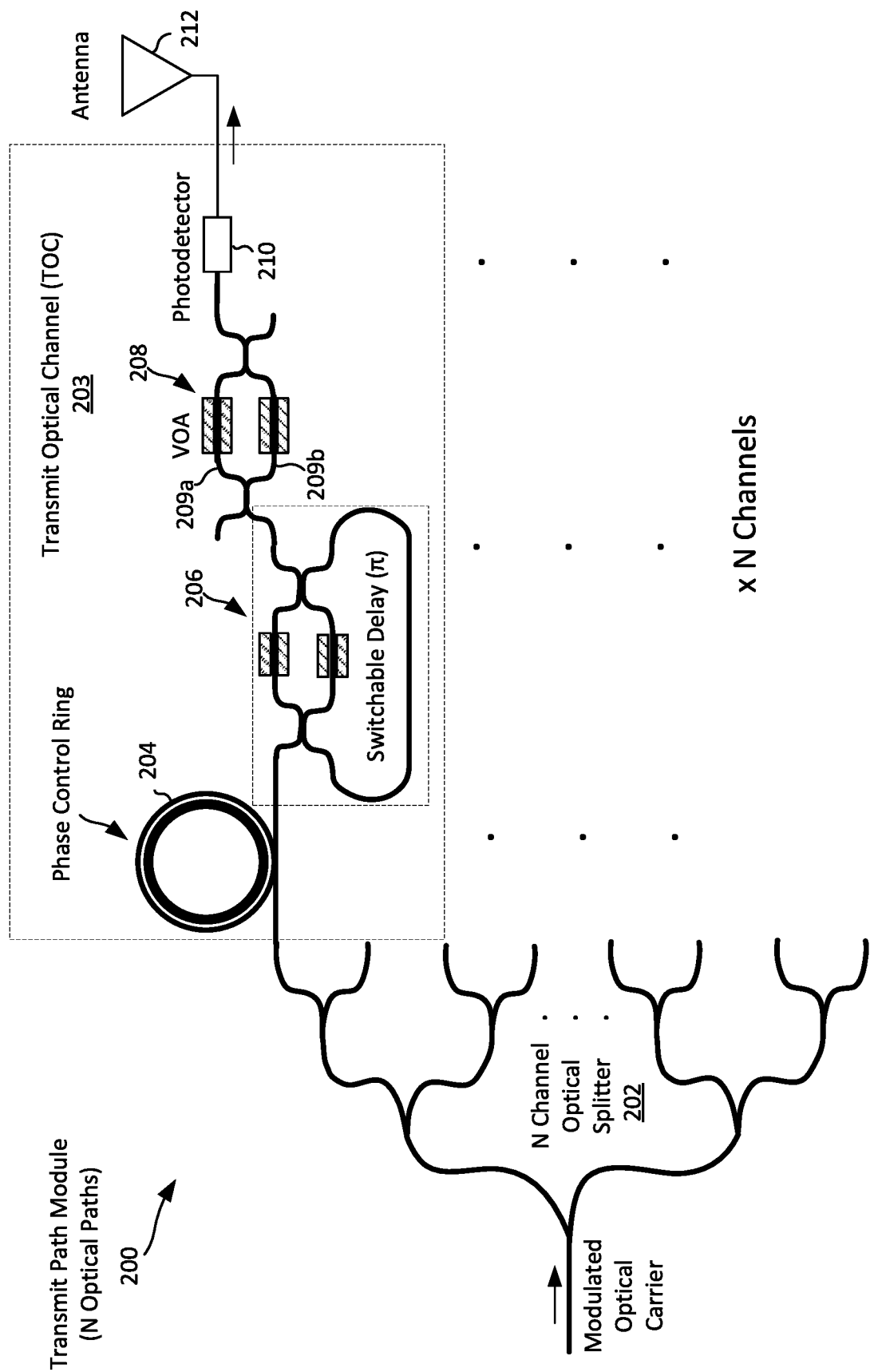
FIG. 2 is a schematic diagram that is useful for understanding a transmit path module (TPM) which can be used in the photonic subsystem in FIG. 1.

Shown in FIG. 2 is a more detailed drawing showing an exemplary TPM 200 comprised of N channels. The TPM 200 includes an N-channel optical splitter 202 which splits the transmit modulated optical carrier (TMOC) signal into a plurality N optical signals. Each of the N optical signals are sometimes referred to herein as a transmit modulated optical subcarrier (TMOS) signal. Each of the N TMOS is respectively communicated to one of N transmit optical channels (TOCs) 203. In order to facilitate clarity of the disclosure, FIG. 2 shows only a single TOC 203 connected to its respective antenna element 212. However, it should be understood that the TPM 200 will include N TOCs connected to N antenna elements 212.

The ultimate purpose of each TOC 203 is to facilitate control over the phase and amplitude of the RF transmit signal which has been modulated on the optical carrier comprising the TMOS. As such, each TOC 203 includes, a phase control ring 204, a switchable delay 206, and a variable optical attenuator (VOA) 208. Each of these devices is electronically controlled responsive to control signals (e.g. PCU control signals 116a received from PCU 112). These control signals have been intentionally omitted from FIG. 2 to facilitate greater clarity concerning the features of the TOC. However, it will be appreciated that each of these devices can be controlled by means of an analog or digital electronic control signal that is provided by a control device, such as PCU 112.

It should be noted that the particular order of the phase control ring 204, the switchable delay 206, and the VOA along the optical path of the TOC is not critical and other orderings of these devices are also acceptable. For example, the order of these three components along the optical path could be reversed. Optical waveguides can be used to facilitate communication of the TMOS between the photonic devices along each channel path in the TPM 200.

The optical splitter 202 is a conventional passive optical power distribution device and is designed to distribute an incident optical beam into N optical beams. It should be appreciated that the optical splitter 202 can be any type of optical splitter that is of relatively low loss and suitable for use with the optical wavelengths employed in the system. In some scenarios, the optical splitter can be comprised of a plurality of Y-splitters in a tree configuration as shown. For example, a fused biconical taper (FBT) splitter can be used for this purpose. In other scenarios (e.g., where N is a relatively large value), the optical splitter 202 can comprise a planar lightwave circuit (PLC) type splitter. Passive optical splitters as described herein are well known in the art and therefore will not be described here in detail.

Phase control rings are well-known in the art and therefore will not be described here in detail. Briefly however, it will be noted that the phase control ring 204 is a type of optical ring resonator. Ring resonators are well-known in the art and are commonly used for various purposes such as filters, modulators and so on. In the TOC shown in FIG. 2, the ring resonator is configured as an "all pass" design to exclusively facilitate phase control. In such configurations, the ring resonator will pass all optical wavelengths within a predetermined operating range without significant attenuation, and the predominant effect of the ring resonator upon the TMOS will only be a phase shift effect as described herein.

A phase control ring is a relatively narrow-band device insofar as it will function to vary phase shift of optical signals only over a narrow range of optical wavelengths. In an optical ring resonator as described herein, phase variations can be introduced to an optical signal traversing the ring by dynamically varying the resonant condition of the ring. The phase variation that is produced in an optical ring resonator such as phase control ring 204 can be produced by a variety of known methods, all of which involve dynamically modifying the resonant condition of the ring resonator. For example, in a silicon nitride type of ring resonator a thermal variation can be used to vary the phase shift produced by the ring by means of a thermo-optic effect. In such a device, a change in temperature of the optical waveguide will result in a change in refractive index of the waveguide material, which in turn will produce a change in the resonant condition of the ring. This variation in the resonant condition of the ring will then produce the desired phase shift.

In the domain of silicon photonics, other known methods for varying the resonant condition of a ring resonator involve carrier injection into the optical waveguide. Such carrier injection can produce a desired variation in optical waveguide refractive index, and consequently in ring resonant condition. In a lithium niobate type of ring resonators, an electric field applied across the optical waveguide can cause a variation in the waveguide refractive index, which in turn will produce a variation in the resonant condition of the ring. In some scenarios, the phase control ring 204 is a thermally tuned ring resonator, with its resonance tuned to the wavelength of optical carrier used in the system. This type of ring resonator functions by changing the phase of the optical carrier with respect to the phase of the microwave or millimeter-wave sideband. As such the phase control ring 204 can facilitate variable phase adjustments within a predetermined range.

The predetermined phase tuning range of a phase control ring will vary with the particular design but will always be less than 360°. For example, in some scenarios a phase control ring as described herein will provide phase a phase adjustment range of between about 0° and 70°. In other scenarios, a phase adjustment ring can provide a phase shift adjustment range of between about 0° and 300°. In still other scenarios, a phase shift adjustment range of a phase control ring can be between about 0° and 350°.

Figure 4:
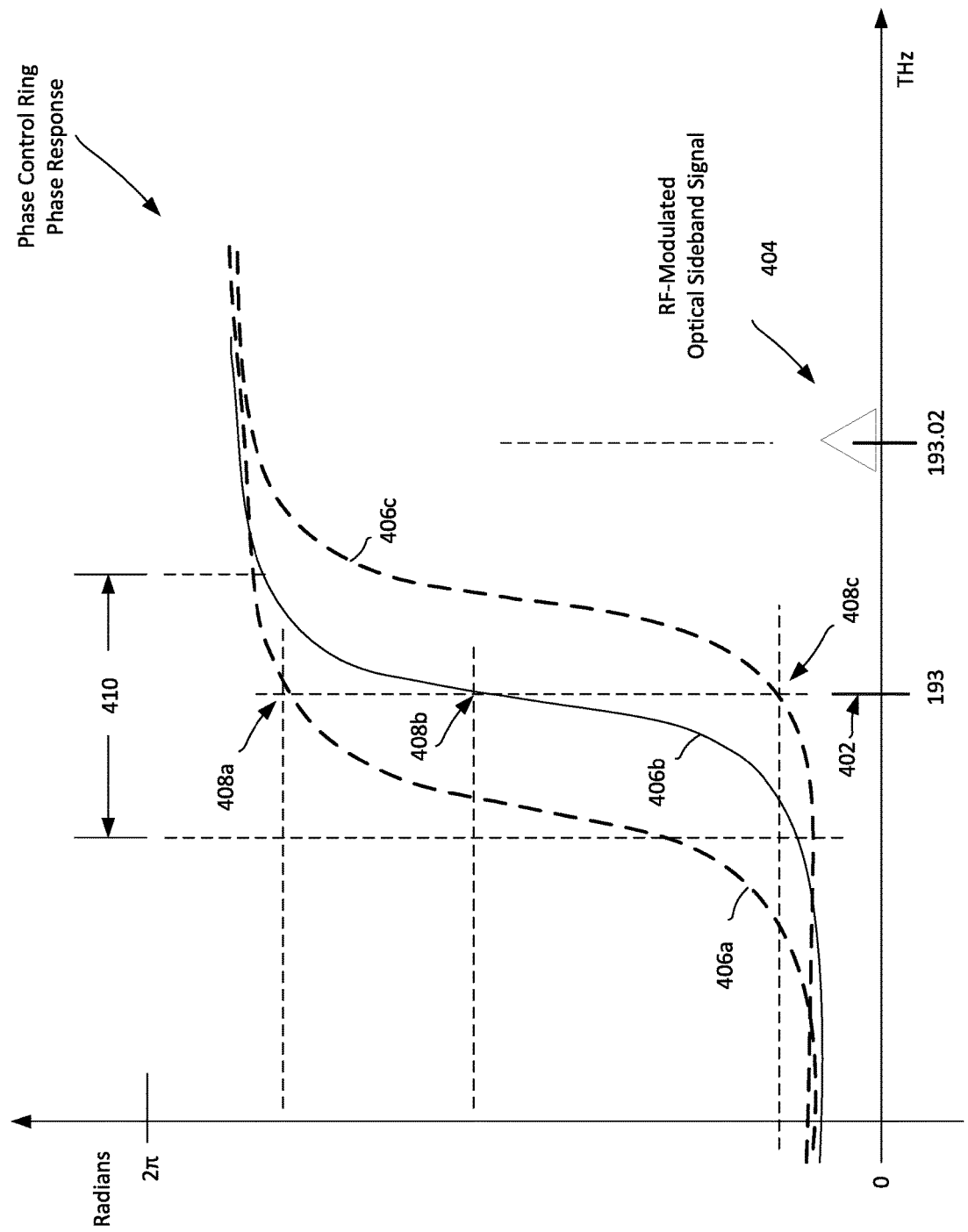
FIG. 4 is a plot that is useful for understanding a phase response of an optical carrier signal and modulated sideband signal resulting from the function of a phase control ring.

The function of the phase control ring 204 is illustrated in FIG. 4 which shows a scenario in which a 20 GHz microwave signal is modulated on a 193 THz optical carrier. The TMOS in this scenario will comprise a component of the original optical carrier signal 402, plus an optical sideband signal 404 produced as a result of the modulation process. The optical sideband signal 404 will contain the information comprising the transmit RF signal which was used to modulate the optical carrier. As shown in FIG. 4, a phase response curve 406b of the phase control ring will include a dynamic region 410 where the magnitude of the phase shift introduced by the ring is highly dependent on the frequency of the applied optical carrier signal. In the case of phase response 406b, it can be observed that this dynamic region is approximately aligned with the frequency of the optical carrier 402. However, controlled adjustments in the resonant condition of the phase control ring 204 will cause changes in the phase response of the ring. These changes will generally involve a shifting of the dynamic region 410 along the frequency axis so that a variable selected phase shift is applied to an optical carrier signal 402.

For example, in FIG. 4 it can be observed that a first resonant condition will result in a phase response curve 406a, a second resonant condition will result in phase response curve 406b, and a third resonant condition will result in a phase response curve 406c. Note that the change in resonant condition will result in a change in the phase shift caused at the optical carrier frequency. Accordingly, a phase shift applied to an optical carrier signal 402 will be different depending on the resonant condition of the ring. For example, in FIG. 4, optical carrier signal 402 will experience a first phase shift 408a when the resonant condition in the ring results in the phase shift curve 406a, a second phase shift 408b when the resonant condition of the ring results in the phase shift curve 406b, and a third phase shift 408c when the resonant condition of the ring results in the phase shift curve 406c.

It can be observed in FIG. 4 that the dynamic region 410 of the phase control ring 204 extends over a relatively narrow range of optical frequencies. In this frequency range relatively small changes in the resonant condition will substantially change the phase of a first optical signal in the frequency range of the dynamic region, without substantially affecting the phase of optical signals outside the frequency range of such region. For example, in FIG. 4 it can be observed that a phase variation can be applied to the optical carrier 402 at 193 THz without significantly affecting the phase of the RF modulated optical sideband 402 at 193.02 THz.

From the foregoing it can be appreciated that the phase control ring 204 can shift the phase of the optical carrier 401 as compared to the phase of the RF-modulated optical sideband 404. This characteristic is attributable to the relatively narrow bandwidth of the dynamic region 410. Consequently, with the arrangement described herein, the phase of the optical carrier 402 can be adjusted independently of the phase of the RF modulated optical sideband 404. The result is that a phase difference can be selectively caused in each TMOS as between the optical carrier and the RF signal-modulated optical sideband. Of course it should be understood that the frequency of the optical carrier and the microwave signal described in relation to FIG. 4 are provided merely by way of example and are not intended to limit the scope of the present disclosure in any way. Rather, the RF components (e.g. RF transceiver, antenna array) and the photonic subsystem can implemented for a wide range of optical carrier signals and microwave (or millimeter wave) RF signals, without limitation.

As noted above, a single phase control ring 204 will always provide less than 360° or 2π radians of phase shift. But it is advantageous in beam steering operation for each TOC 203 to have the ability to apply a full 360° or 2π radians of phase shift to the optical carrier component of each TMOS. To ensure that each TOC can provide such a phase shift, a second phase control ring 204 could be added along the optical path to increase the range of phase control by a factor of two. However, in some scenarios a switchable delay element 206 can instead be provided along the optical path in the TOC. The switchable delay element 206 can selectively add 180° or n radians of delay along the optical path in the TOC 203. Accordingly, by coordinating the operation of the phase control ring 204 and the switchable delay element 206, a greater range of control can be achieved with relatively low power consumption.

As is known, pure beam-steering of phased arrays is achieved through true time delay of the signal applied to each antenna element, whereby the various antenna elements of an array receive delayed versions of the same signal. In a scenario disclosed herein, the phase control ring 204 adjusts the phase difference of the optical carrier with respect to the optical sideband and approximates beam-steering for small arrays, small angles, and small bandwidth signals. But a single ring based phase shifter does not give a full +/−π phase shift. Instead of using a second phase control ring, the switchable delay element 206 is provided which gives enough delay to correspond to a n phase shift of the RF signal. The switchable delay element 206 is a true time delay element and therefore does not adjust the relative phases between the optical carrier and the optical sidebands.

Optical delay elements are well-known in the art and the exact configuration of the switchable delay 206 is not critical. However, the device should be capable of selectively adding or inserting an optical delay of 180° or n radians in the optical path of the TOC in response to a control signal. In this regard it will be understood that the switchable delay 206 can change the path length when needed by increasing the path length by an amount equal to 180° or n radians at the wavelength of the optical carrier. In the scenario shown in FIG. 2, the switchable delay element is a conventional binary switch delay, which is well-known in the art and commonly used in fiber based optical delay systems. Still, it should be understood that other types of switchable optical delay lines now known or known in the future can be used without limitation.

One advantage of using a switchable delay element 206 as described is that it tends to have a lower power consumption as compared to the addition of a second phase control ring 204. A further advantage of this approach is that use of the switchable delay element can simplify the necessary control circuitry in the TOC 203 as compared to the use of two phase control rings. Of course, in a scenario where these factors are not a concern, a second phase ring 204 could be used instead of the switchable delay 206 to facilitate the full 360° or 2π radians of phase control.

The VOA is added to tune the amplitude of the TMOS signal. VOA elements in the field of optics are well-known in the art and the exact configuration of the VOA 208 is not critical provided that it does not otherwise introduce unwanted phase variations in the optical carrier relative to the optical sideband. In a scenario shown in FIG. 2, the VOA can be comprised of a tunable arrangement whereby the amount of optical power passed through the device to the photodetector 210 can be continuously varied over a predetermined range (e.g., 0 to 100%) in response to a control signal.

In some scenarios, the VOA 208 can comprise an interferometric device which operates by splitting an input optical signal (the TMOS) into two optical paths 209a, 209b. Thereafter, a broadband phase difference will be introduced as between the TMOS signal communicated along each path. For example, this broadband phase difference can be introduced by first and second refractive index tuning elements which are respectively disposed along each optical path. These refractive index tuning element can cause selective variations in the refractive index along each path so as to produce the desired phase shift to signals traversing each path. The refractive index variations can be implemented using a thermo-optic effect, carrier injection, electro-optic effect or any other suitable tuning mechanism. When the signals traversing the two paths are subsequently recombined, the amount of phase difference introduced between the two paths will determine the extent to which the signals will constructively add, or destructively subtract from each other.

It should be noted that in an interferometric type VOA device as described, the broadband phase shift introduced is different from the narrowband phase shift operations performed in the phase control ring 204. As explained with reference to FIG. 4, the narrowband phase shift introduced in the phase control ring 204 will produce a phase shift in the optical carrier 402 while not affecting the phase of the RF modulated optical sideband signal 404. This results in a selectively variable phase difference between the carrier and the optical sideband. In contrast, the broadband phase shift introduced in an interferometric type VOA 208 will concurrently introduce a phase shift into both the optical carrier signal and the optical sideband produced as a result of the RF modulation. Since phase variations are concurrently introduced to both signals in the interferometric type of VOA 208, there will be no phase difference or variation caused as between the optical carrier signals and the optical sideband signal.

Other types of VOA devices can also be used for variably attenuating the modulated optical signal. For example, in some scenarios an electro-absorption type of VOA can be used in which an absorption or attenuation of a certain optical wavelengths in an optical waveguide is varied in response to changes in an applied electric field. Other alternatives to varying attenuation can involve selectively flooding the optical waveguide with electrons to increase attenuation. The specific mechanism used to perform the variable attenuation function is not critical and any type of VOA whether now known or known in the future can be used for this purpose The TOC also includes a photodetector 210 (optical demodulator) for converting the phase and amplitude adjusted optical carrier back to an RF signal. The photodetector 210 is an optical to electrical signal converter (optoelectric converter) which receives the modulated optical carrier signal as an input. Basically, the photodetector will extracts the modulated RF signal from the optical carrier and produces the RF signal as an output. Photodetectors as referenced herein are well known in the art and therefore will not be described detail. However, it should be understood that such devices will commonly include a solid state semiconductor element which varies an electric current responsive to the incident optical signal. As is known, a continuous wave optical carrier signal will be converted by the photodetector to a DC output signal. But an optical carrier and its RF modulated optical sideband 404 will interfere with each other at the photodetector so that an alternating electrical current variation is introduced in the DC output of the photodetector. This alternating electrical current variation will correspond to the original RF signal, phase shifted and gain adjusted in accordance with the operations of the TOC. As shown in FIG. 2, the output of the photodetector 210 is coupled to an antenna element 212, which is one of a plurality of N antenna elements forming an antenna array.

From the foregoing it will be understood that transmit operations can begin with an RF signal (e.g., a microwave or millimeter-wave RF signal) that is generated in a transceiver (e.g. RF transceiver 102). The phase and amplitude of the RF signal is modulated onto an optical carrier signal at optical modulator 103. The resulting transmit modulated optical carrier (TMOC) signal is then split into N different optical paths, each comprising a reduced power version of the same TMOC signal, referred to herein as a transmit modulated optical subcarrier (TMOS). In a scenario disclosed herein N can correspond to the number of antenna elements in use in the phased array antenna.

The TPM 108 is advantageously configured to facilitate selective independent adjustment of both the amplitude and RF phase of each of the N TMOS signals communicated along each of the N paths defined by the TOCs 203. After passing through a respective TOC, each of the N TMOS signals is respectively received at one of N photodetectors proximate to one of the N antenna elements 212. Each photodetector 210 extracts the RF signal information from its respective TMOS signal and produces the phase and gain adjusted RF signal as an output.

Each of these N independent RF signals are then respectively coupled to one of the N antenna elements. Notably, each of these RF signals will have a RF phase and amplitude that is independently controlled in accordance with the adjustments made in its respective TOC 203. These RF signals are then respectively used to feed the N antenna elements so as to form a desired antenna beam.

Figure 3:
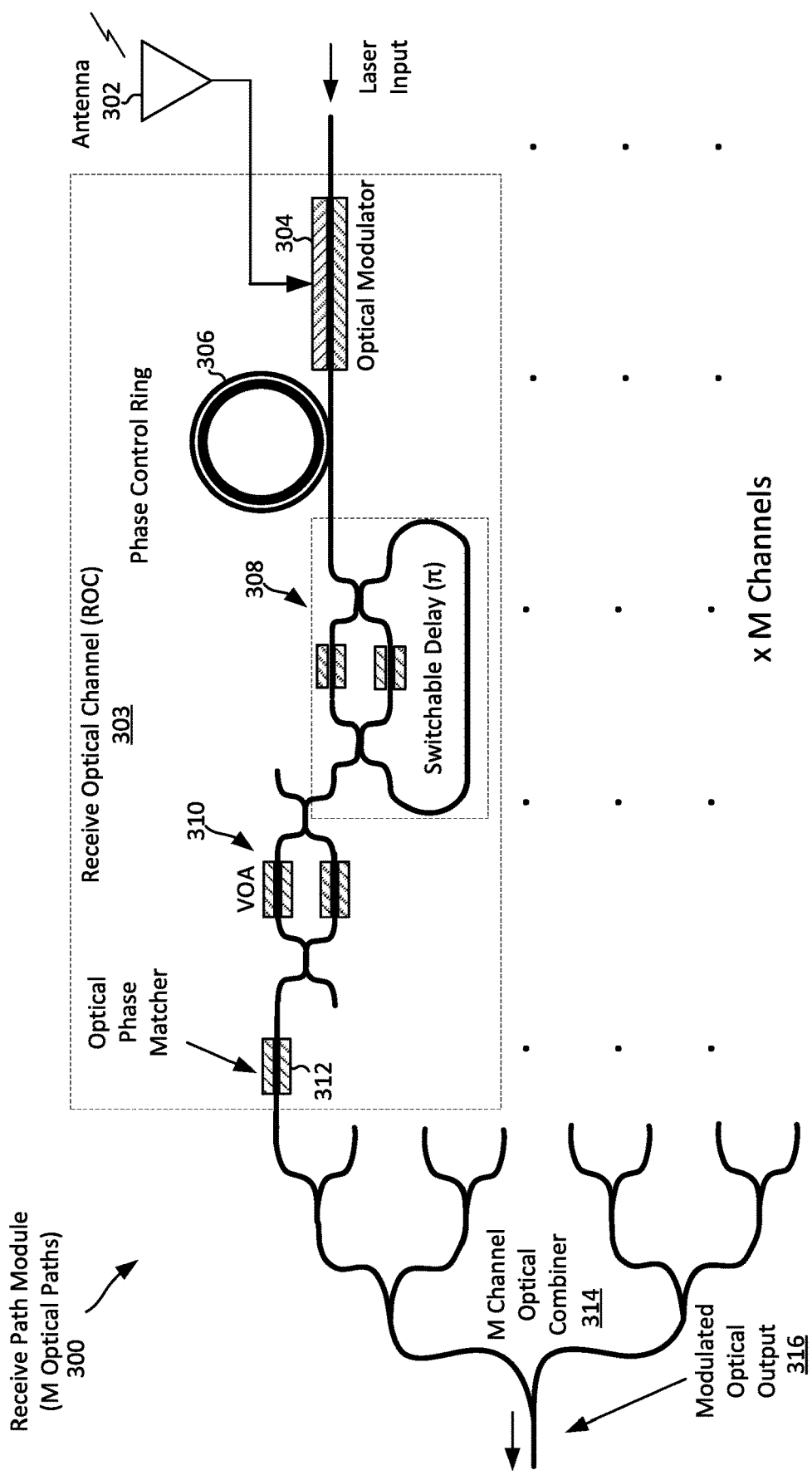
FIG. 3 is a schematic diagram that is useful for understanding a receive path module (RPM) which can be used in the photonic subsystem in FIG. 1.

Shown in FIG. 3 is a more detailed drawing of an exemplary RPM 300. The RPM 300 includes M receive optical channels (ROCS) 303, where M is an integer value greater than one. Each ROC 303 is respectively connected to one of M antenna elements 302 which form an antenna array (e.g., antenna array 106). In order to facilitate clarity of the disclosure, FIG. 3 shows only a single ROC 303 connected to its respective antenna element 302. However, it should be understood that the RPM 300 will actually include M ROCs 303 that are connected to M antenna elements 302. In some scenarios, the antenna elements 302 that are connected to the ROC are the same antenna elements 212 which are connected to the TOC, in which case M can be equal to N. In such scenarios, the same antenna array can be used for both receive and transmit operations.

Within each ROC 303, an RF receive signal is communicated to an optical modulator 304 from an antenna element 302 connected to that particular ROC. Also received at the optical modulator 304 is an optical subcarrier signal provided by an optical laser source (not shown in FIG. 3). The optical modulator 304 utilizes the RF receive signal from the antenna element 302 as an exciter signal to excite or modulate the optical subcarrier signal. The resulting signal is referred to herein as a receive modulated optical subcarrier (RMOS). As is known, an optical modulator 304 will produce a resulting output which includes the original optical subcarrier and an optical sideband signal, which is offset in frequency from the frequency of the optical subcarrier.

The ultimate purpose of each ROC 303 is to facilitate control over the phase and amplitude of the RF receive signal which has been modulated on the optical carrier by the optical modulator 304. Within the ROC 303, this control is asserted by using optical processing means similar to those described herein with respect to the TOC 203. As such, each ROC 303 includes, a phase control ring 306, a switchable delay 308, a variable optical attenuator (VOA) 310, and an optical phase matcher 312. Each of these devices is electronically controlled using suitable analog or digital control signals. For example, these devices may be controlled by using PCU control signals 116b received from a PCU 112. The control signals for the phase control ring 306, the switchable delay 308, the VOA 310, and the optical phase matcher 312 have been intentionally omitted from FIG. 3 to facilitate greater clarity of the disclosure.

It should be noted that within the ROC 303, the particular order of the phase control ring 306, the switchable delay 308, and the VOA 310 along the optical path is not critical and other orderings of these devices are also acceptable. For example, the order of these components along the optical path could be reversed. Optical waveguides are used to facilitate communication of the RMOS signal between the various photonic devices along each channel path in the RPM 300. The characteristics of the phase control ring 306, the switchable delay 308, and the VOA 310 are similar to the phase control ring 204, switchable delay 206 and VOA 208. Accordingly, the description of these elements provided above is sufficient for understanding the phase control ring 306, the switchable delay 308 and the VOA 310.

In the receive direction, M RF receive signals are received respectively at the M antenna elements 302. Each of these M RF receive signals is respectively modulated onto one of M separate optical subcarrier signals by an optical modulator 304 in a corresponding ROC 303, where each ROC 303 is associated with a particular one of the M antenna elements. The resulting M received modulated optical subcarrier (RMOS) signals are then communicated along M different optical paths respectively defined in the M ROCs. Within each ROC 303 a phase difference is selectively controlled as between an optical subcarrier and optical sideband comprising each RMOS. Likewise, an amplitude of each RMOS is selectively controlled. The amplitude and phase adjustments in each channel are applied independently in each ROC so that different phase and amplitude adjustments can be applied in each TOC. For example, these values can be independently controlled in response to control signals 116b received from PCU 112. These adjustments can be used so as to steer and form a desired receive antenna beam for receive operations.

After having the necessary phase and amplitude adjustments applied to facilitate any necessary beam-control operations, the M RMOS signals are combined into a single modulated optical output signal 316 by the M-channel optical combiner 314. The M-channel optical combiner can be a conventional passive optical power combiner which is designed to combine a plurality of M incident optical beam into a single optical beam. It should be appreciated that the optical combiner 314 can be any type of optical combiner that is of relatively low loss and suitable for use with the optical wavelengths employed in the system. In some scenarios, the optical combiner can be comprised of a plurality of Y-combiners in a tree configuration as shown in FIG. 3. For example, a fused biconical taper (FBT) type combiner can be used for this purpose. In other scenarios (e.g., where M is a relatively large value), the optical combiner 314 can comprise a planar lightwave circuit (PLC) type combiner. Passive optical combiners as described herein are well known in the art and therefore will not be described here in detail.

The purpose of the optical phase matcher 312 is to ensure that the optical carrier portion of each RMOS from each TOC is combined constructively in the M-channel optical combiner. Recall that the RMOS signal traversing each ROC 303 will actually comprise an optical carrier and an optical sideband signal produced as a result of the optical modulator function. The phase difference between the optical carrier and the optical sideband will determine the phase of the RF signal reproduced by a photodetector (e.g., photodetector 111). But for combining purposes, it is necessary to consider the phase of the optical carrier in each ROC path as compared to a phase of the optical carriers in the other TOC paths. In the transmit direction, this is not an issue because there is no need to re-combine the optical carriers. But in the receive direction, a failure to properly align the phase of the optical carriers comprising each RMOS will result in destructive interference when the signals are combined in the M channel optical combiner 314.

The phase of an RF signal that is ultimately reproduced from each RMOS signal is based on a phase difference between the optical carrier and the optical sideband. So it is important that the optical phase matcher 312 preserves this important phase information while matching the phase of the optical carrier of each RMOS. Accordingly, the design of the optical phase matcher 312 is advantageously selected so that it will concurrently result in an approximately equal phase shift in both the optical carrier and its associated optical sideband signal contained in each RMOS. In this regard, the optical phase matcher 312 is preferably a broadband design capable of facilitating approximately equal phase shifts in both the optical carrier and the optical sideband of each RMOS traversing through each ROC.

The exact design of such optical phase matcher 312 is not critical provided that it is capable of performing broadband phase shifts as described herein. Exemplary techniques that can be used for affecting such broadband phase shifts are known in the art and therefore will not be described here in detail. However, such techniques can involve the use of a refractive index tuning element disposed along the optical path. In such elements, selective variations in the refractive index can produce the desired phase shift to signals traversing each path. The refractive index variations can be implemented using a thermo-optic effect, carrier injection, electro-optic effect or any other suitable tuning mechanism.

As with the optical carrier portion of the RMOS, the optical sideband signals comprising each RMOS will also be combined in the M channel optical combiner. However, in the case of the M optical sideband signals, the phase offsets respectively introduced in each of the ROCs 303 will result in a controlled combing operation that facilitates beam steering in the receive direction. Phased array techniques to facilitate such beamforming are well known in the art and therefore will not be described here in detail. Likewise, gain offsets respectively introduced in each of the M ROCs can be used for receive channel beam shaping operations (e.g. sidelobe suppression and beam shaping) in accordance with known phased array techniques.

The single modulated optical signal 316 output from the combiner 313 can be coupled to a photodetector (e.g., photodetector 111) to extract the combined receive channel RF signal information. The RF signal is then processed further in accordance with conventional signal processing methods. For example, the received signal can be demodulated or processed in a signal processing system associated with RF transceiver 102 to extract data which has been communicated by means of the RF signal.

The ROC architecture shown in FIG. 3 assumes a single sideband modulation, which can be facilitated by utilizing a conventional Mach-Zehnder modulator (MZM) as the optical modulator 304. But in some scenarios, it can be advantageous to instead use a conventional ring-based modulator in the receive path rather than an MZM type modulator. For example, a ring-based modulator in the receive path can be advantageous for purposes of facilitating improved receiver sensitivity performance.

Although a ring-based modulator can have certain advantages, one potentially negative aspect is that these types of modulators will generally produce dual sideband modulation. In other words, an RMOS produced using a ring-based modulator will have an optical sideband both above and below the frequency of the optical subcarrier comprising the RMOS. Such a dual sideband signal can present some problems with respect to the phase control ring 306. A ring-based phase shifters such as phase control ring 306 generally will not work well with dual sideband modulation as such phase shifters are narrowband devices and can introduce distortion into the lower sideband of the RMOS.

In order to overcome this problem various solutions are possible. For example, in one scenario, the dual sideband RMOS can be filtered down to a single sideband. The optical filter component can be disposed in FIG. 3 between the optical modulator 304 and the phase control ring 306 to remove the unwanted sideband signal. In such a scenario, a ring-based phase shifter arrangement (i.e., phase control ring 306) can provide satisfactory results. Alternatively, the RMOS output from the optical modulator 304 can be allowed to remain as a dual sideband signal, in which case a multi-ring phase shifter (not shown) such that the phase of both optical sidebands is shifted relative to the optical subcarrier. Also, other system architectures can be implemented that do not use ring-based phase shifters, and these architectures can be more suitable for systems that use ring modulators producing dual sideband modulation. Accordingly, the methods and systems disclosed herein are not limited to the architecture shown in FIG. 3.

The systems described herein can comprise one or more control components such as a processor, an application specific circuit, a programmable logic device, or other circuit programmed to perform the antenna beam control functions described herein. In some scenarios, these components can include an antenna control processor (ACP) 114. To facilitate antenna beam control functions, the ACP 114 can be in communication with RF transceiver 102 and PCU 112. In some scenarios, antenna beam control can be cooperatively facilitated by a combination of processing elements included in one or more of these components.

From the foregoing, it will be understood that an antenna control system as described herein can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. Alternative embodiments can be realized in several interconnected computer systems (e.g. a combination of ACP 114 and PCU 112). Any kind of computer system or other apparatus adapted for carrying out the methods described herein is suited.

Figure 5:
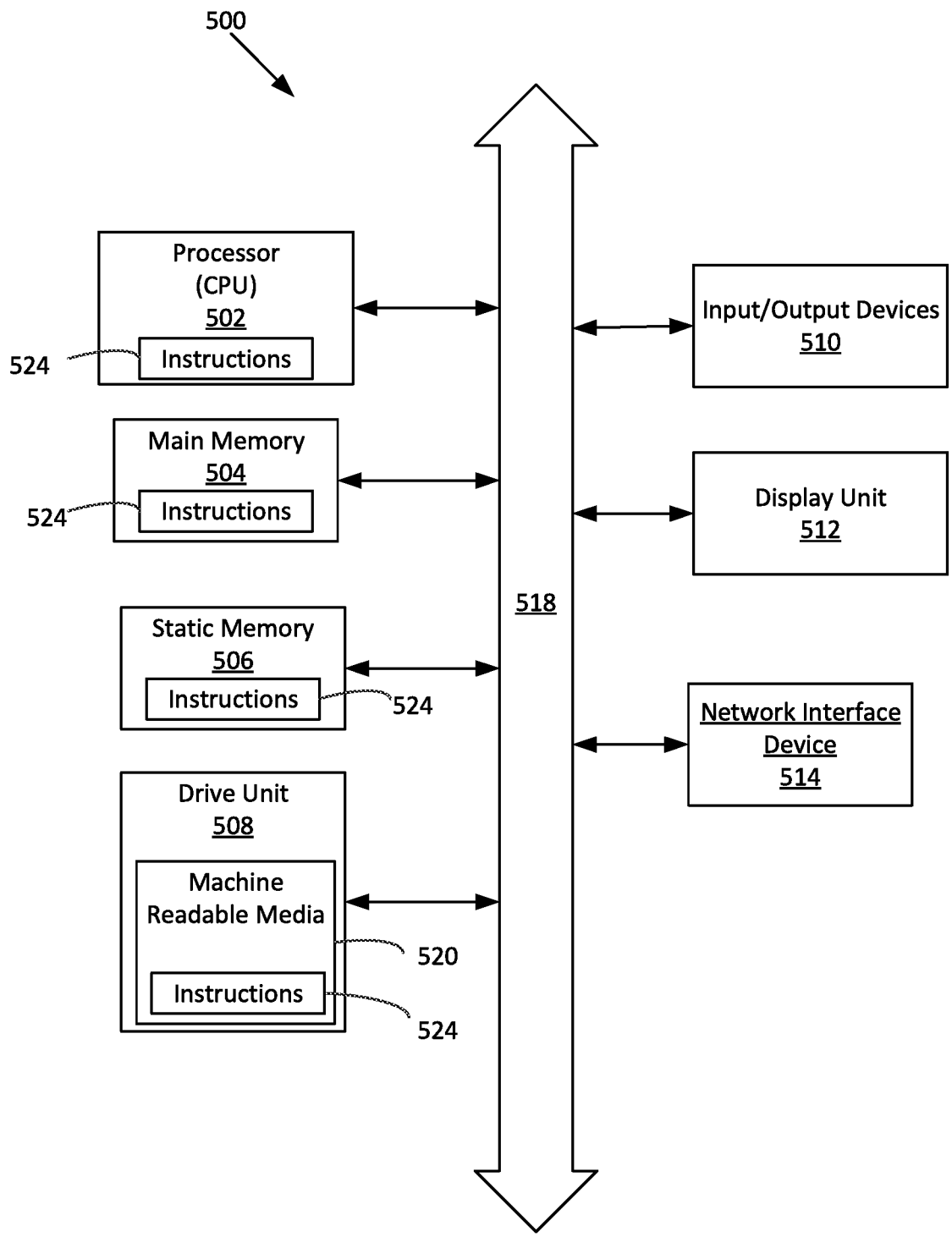
FIG. 5 is a block diagram of an exemplary computer system that can perform processing operations as described herein for purposes of implementing antenna beam steering and beam shaping.

Referring now to FIG. 5, there is shown a hardware block diagram comprising an exemplary computer system 500 which is useful for understanding this disclosure. The computer system is a machine that can include a set of instructions which are used to cause the computer system to perform any one or more of the methodologies discussed herein. The exemplary computer system 500 can correspond to one or more of the antenna control processor 114 and the PCU 112. In some embodiments, the computer 500 can operate independently as a standalone device. However, embodiments are not limited in this regard and in other scenarios the computer system can be operatively connected (networked) to other machines in a distributed antenna control system environment to facilitate certain operations described herein. Accordingly, while only a single machine is illustrated it should be understood that embodiments can be taken to involve any collection of machines that individually or jointly execute one or more sets of instructions as described herein.

The computer system 500 is comprised of a processor 502 (e.g. a central processing unit or CPU), a main memory 504, a static memory 506, a drive unit 508 for mass data storage and comprised of machine readable media 520, input/output devices 510, a display unit 512 (e.g. a liquid crystal display (LCD), a solid state display, or a cathode ray tube (CRT)), and a network interface device 514. Communications among these various components in FIG. 5 can be facilitated by means of a data bus 518. One or more sets of instructions 524 can be stored completely or partially in one or more of the main memory 504, static memory 506, and drive unit 508. The instructions can also reside within the processor 502 during execution thereof by the computer system. The input/output devices 510 can include a keyboard, a mouse, a multi-touch surface (e.g. a touchscreen) and so on. The network interface device 514 can be comprised of hardware components and software or firmware to facilitate wired or wireless network data communications in accordance with a network communication protocol utilized by a data network.

The drive unit 508 can comprise a machine readable media 520 on which is stored one or more sets of instructions 524 (e.g. software) which are used to facilitate one or more of the methodologies and functions described herein. The term "machine-readable mediA" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 500 should be understood to be one possible example of a computer system which can be used to facilitate certain antenna and beam steering control operations described herein. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that various embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 6:
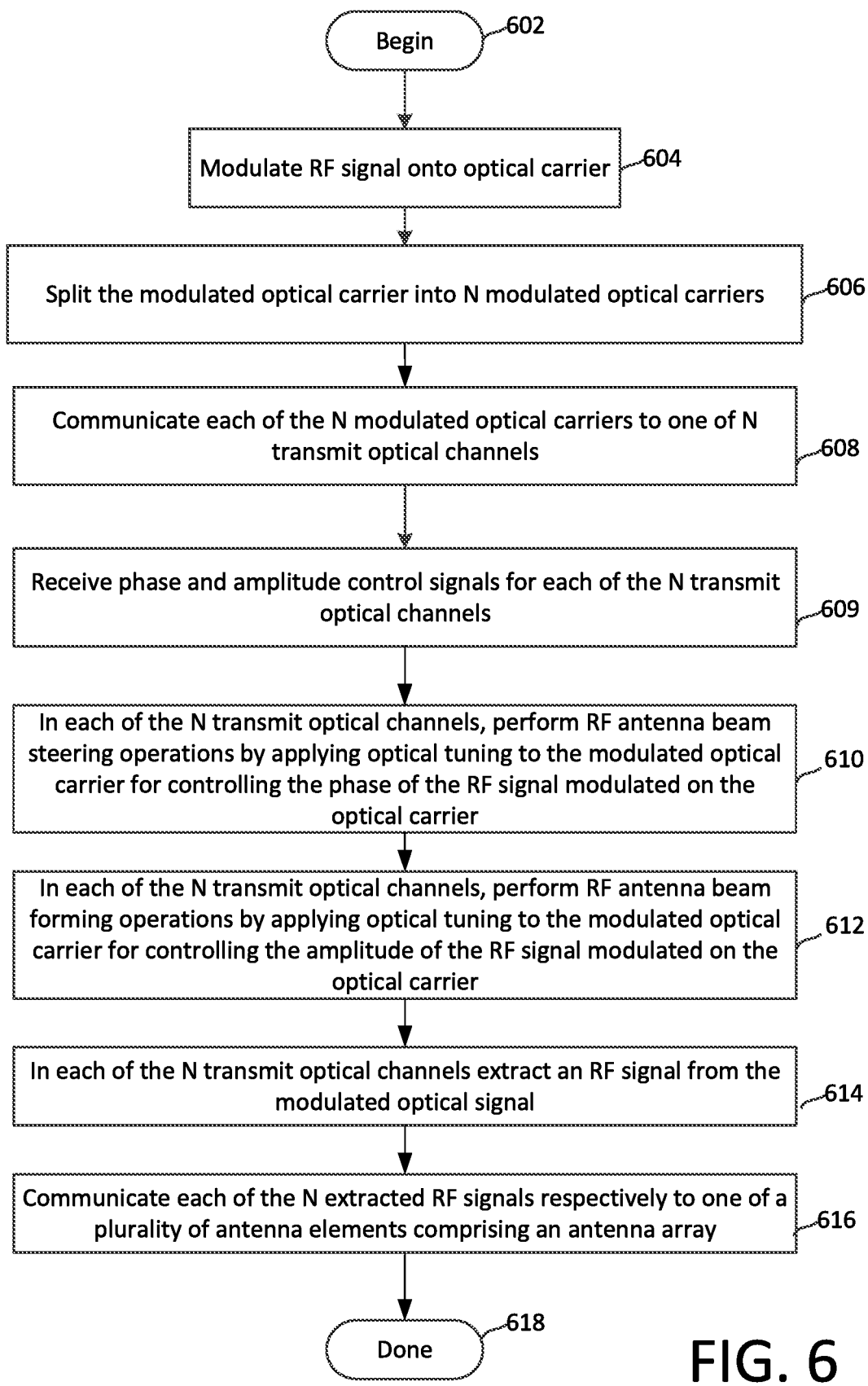
FIG. 6 is a flowchart that is useful for understanding how a phase and amplitude of an RF signal in a transmit path can be controlled in the optical domain for purposes of antenna beam steering and shaping.

Referring now to FIG. 6, there is a shown a flowchart that is useful for understanding a process for transmit antenna beam steering that is facilitated by photonic subsystem 104. The process begins at 602 where an RF signal is modulated onto an optical carrier signal to produce the TMOC. At 606 the process continues by splitting the modulated optical carrier signal into N transmit modulated optical subcarriers (TMOS). At 608 each of the N transmit modulated optical carriers is respectively communicated to one of N transmit optical channels (TOCs).

At 609 phase and amplitude control signals are received at each of the N TOCs. For example, these phase and amplitude control signals (e.g., PCU control signals 116a, 116b) can be provided by the PCU 112 based on antenna beam pattern requirements specified by the ACP 114. Thereafter, in each of the N TOCs, RF antenna beam steering operations are performed at 610. This step involves each of the N TOCs performing necessary phase adjustments to a respective one of the TMOS signals as described herein.

In each of the N transmit optical channels, further RF antenna beam shaping operations are performed at 612 by applying optical tuning to the TMOS for controlling the amplitude of the TMOS. Finally, each of the N TMOS signals are communicated to a separate photodetector at 614 to extract the RF signal for that channel. The RF signal will have the necessary amplitude and phase adjustments as a result of the optical processing described herein. At 616 the extracted RF signal can then be communicated to a respective one of the antenna array elements. The process can then terminate at 618 or continue with other processing.

Figure 7:
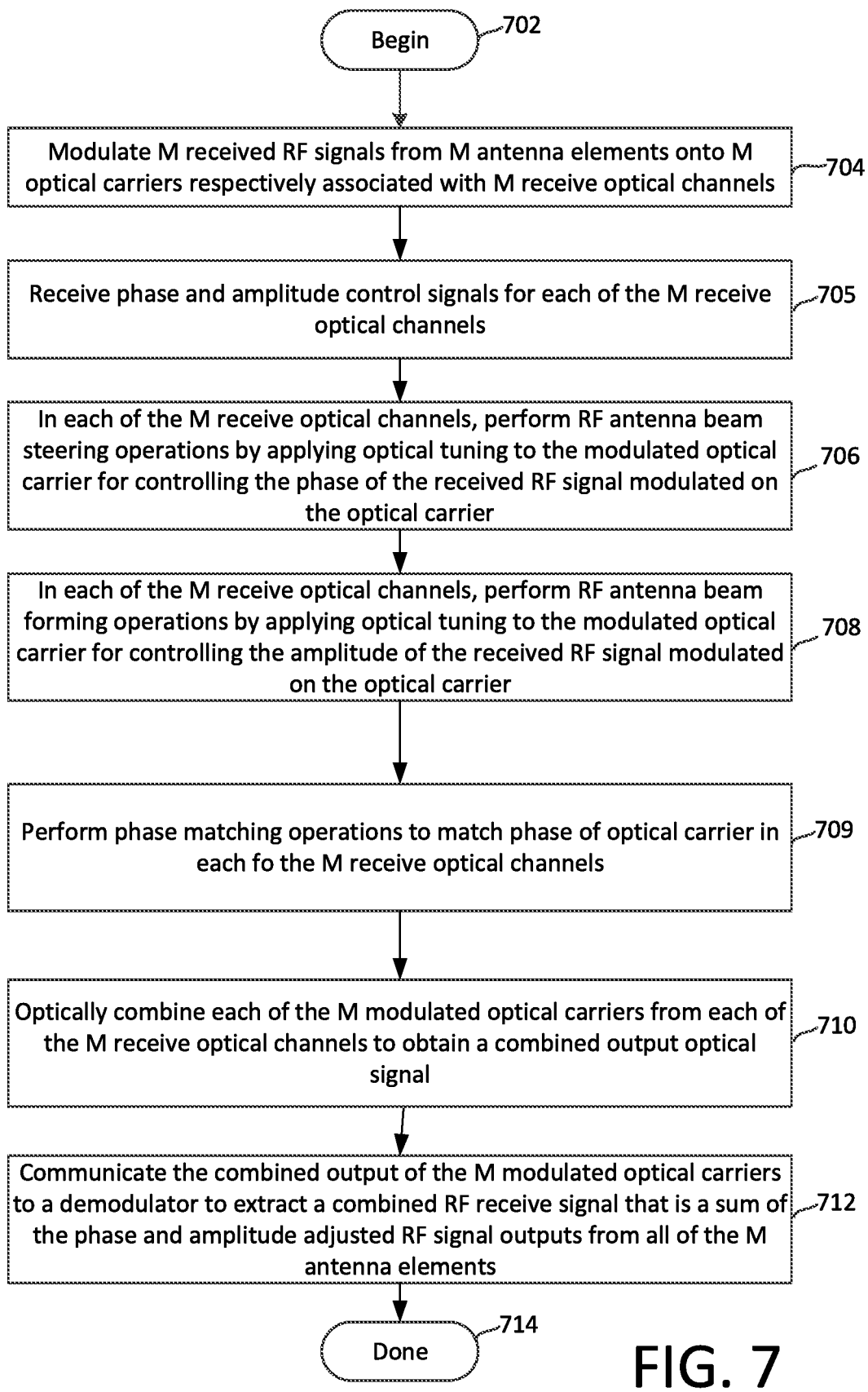
FIG. 7 is a flowchart that is useful for understanding how a phase and amplitude of an RF signal in a receive path can be controlled in the optical domain for antenna beam steering and shaping.

Referring now to FIG. 7, there is a shown a flowchart that is useful for understanding a process for receive antenna beam steering that is facilitated by photonic subsystem 104. The process begins at 702 and continues at 704 where each of M RF signals from M antenna element is respectively modulated onto an optical subcarrier signal in one of M receive optical channels (ROCs) for producing a receive modulated optical subcarrier (RMOS).

At 705 phase and amplitude control signals are received at each of the M ROCs. For example, these phase and amplitude control signals can be provided by the PCU 112 based on receive antenna beam pattern requirements specified by the ACP 114. Thereafter, in each of the M ROCs, RF antenna beam steering operations are performed at 706 by applying optical tuning to the RMOS for controlling the phase difference between the optical carrier and the optical sideband.

In each of the M ROCs, further RF antenna beam forming operations are performed at 708 by applying optical tuning to the RMOS for controlling amplitude of the RMOS. This step involves each of the M ROCs performing necessary amplitude adjustments specified by the PCU 112. At 709 an optical carrier phase of the RMOS in each ROC is matched with a phase of the optical carriers in each of the other M ROCs. This step is performed in preparation for combining operations at 710. Following steps 706-709, each of the RF signals associated with the M optical carriers will have the necessary amplitude and phase adjustments as a result of the optical processing described herein.

At 710, each of the M RMOS signals from each of the M ROCs is optically combined to obtain a combined output optical receive signal. Thereafter, at 712, the combined output of the M RMOS signals is communicated to a photodetector to extract the combined RF receive signal. The combined RF receive signal will be a sum of the phase and amplitude adjusted RF signal outputs from all of the M antenna elements. The process can then terminate at 714 or can continue with other processing.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the disclosure provided here has been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above described embodiments. Rather, the scope of the invention should be defined in accordance with the following claims and their equivalents.

We claim:

1. A method for controlling a phased array antenna system, comprising:
   modulating an RF transmit signal onto an optical carrier to form a transmit modulated optical carrier (TMOC) comprised of the optical carrier and an optical sideband;
   splitting the TMOC into N transmit modulated optical subcarriers (TMOS), where N is an integer value greater than 1;
   respectively processing each TMOS in one of N transmit optical channels (TOCs);
   in each TOC, performing RF antenna beam steering operations by optical tuning the TMOS to selectively control a phase difference between the optical carrier and the optical sideband;
   processing the TMOS from each of the N TOCs to obtain N RF signals, each having a controlled phase attribute as a result of the optical tuning; and
   communicating the N RF signals respectively to N antenna elements which comprise an antenna array;
   wherein a phase adjustment that is applied to each TMOS is selectively coordinated so as to control a boresight direction of a composite antenna transmit beam produced by the N antenna elements when excited by the N RF signals.

2. The method according to claim 1, further comprising in each TOC, performing RF antenna beam forming operations by optically tuning the TMOS to selectively control an amplitude of the RF signal applied to each of the N antenna elements.

3. The method according to claim 2, further comprising receiving in each of the N TOCs a channel amplitude control signal applicable to a respective one of the N transmit optical channels and specifying an amplitude adjustment to be applied using the optical tuning.

4. The method according to claim 1, wherein the phase difference between the optical carrier and the optical sideband of each said TMOS is controlled in the TOC using a phase control ring.

5. The method according to claim 4, wherein the phase difference between the optical carrier and the optical sideband of each said TMOS is controlled in the TOC using a switchable delay element.

6. The method according to claim 1, further comprising:
   modulating M received RF signals from M antenna elements respectively onto M optical subcarriers to form M receive modulated optical subcarriers (RMOS), each comprised of a receive optical subcarrier signal and a receive optical sideband signal, where M is an integer value greater than 1;
   processing one of the RMOS respectively in each of M receive optical channels (ROCs); and
   in each ROC, performing RF antenna beam steering operations by optical tuning the RMOS to selectively control a phase difference as between the receive optical carrier signal and the receive optical sideband signal.

7. The method according to claim 6, further comprising adjusting a phase of the receive optical carrier signal in each of the M ROCs so as to match a phase of the receive optical carrier signal in each other of the M ROC.

8. The method according to claim 7 further comprising optically combining the M RMOS to form a receive modulated optical carrier (RMOC).

9. The method according to claim 8, further comprising communicating the RMOC to a photodetector to extract a combined receive RF signal.

10. The method according to claim 6, further comprising selectively coordinating the phase difference that is applied in each of the M RMOS so as to control a boresight direction of a composite antenna receive beam produced by the N antenna elements.

11. A method for controlling a phased array antenna system, comprising:
modulating an RF transmit signal onto an optical carrier to form a transmit modulated optical carrier (TMOC) comprised of the optical carrier and an optical sideband;
splitting the TMOC into N transmit modulated optical subcarriers (TMOS), where N is an integer value greater than 1;
respectively processing each TMOS in one of N transmit optical channels (TOCs);
in each TOC, performing RF antenna beam steering operations by optical tuning the TMOS to selectively control a phase difference between the optical carrier and the optical sideband;
receiving in each TOC a channel phase control signal applicable to a respective one of the TMOS, the phase control signal determining a phase adjustment to be applied to the TMOS using the optical tuning;
processing the TMOS from each of the N TOCs to obtain N RF signals, each having a controlled phase attribute as a result of the optical tuning; and
communicating the N RF signals respectively to N antenna elements which comprise an antenna array.

12. A beam steering system, comprising:
a control processor;
a transmit path module (TPM) configured for receiving as an input a transmit modulated optical carrier (TMOC) comprised of an optical carrier and an RF modulated optical sideband;
an optical splitter in which the TMOC is split into N transmit modulated optical subcarriers (TMOS), where N is an integer value greater than 1; and
a plurality of N transmit optical channels (TOCs), each respectively comprising
a plurality of optical tuning elements configured optical tuning one of the N TMOS to selectively control a phase difference between the optical carrier and the RF modulated optical sideband comprising the TMOS; and
a photodetector configured to extract from the TMOS an RF subcarrier signal in which the signal phase has been selectively modified by the optical tuning;
wherein the control processor is configured to selectively independently control the phase difference applied to the TMOS in each of the N TOCs to coordinate antenna beam steering when a plurality of the RF subcarrier signals are communicated to antenna elements comprising an antenna array.

13. The beam steering system according to claim 12, wherein the phase difference between the optical carrier and the optical sideband of each said TMOS is controlled in the TOC using a phase control ring.

14. The beam steering system according to claim 13, wherein the phase difference between the optical carrier and the optical sideband of each said TMOS is controlled in the TOC using a switchable delay element.

15. The beam steering system according to claim 13, further comprising
a receive path module (RPM) comprised of M receive optical channels (ROCs), each ROC configured for receiving as an input a receive RF signal from a corresponding one of M receive antenna element of an antenna array, and where M is an integer greater than 1;
wherein each ROC is comprised of
an optical modulator configured for modulating the receive RF signal onto a receive optical carrier to form a receive modulated optical subcarrier (RMOS) comprised of an optical carrier and an RF modulated optical sideband;
a plurality of optical tuning elements configured to optical tune the RMOS so as to selectively control a phase difference between the optical carrier and the RF modulated optical sideband comprising the RMOS; and
a phase matching element configured to facilitate a phase match of the optical carrier of the RMOS to each other of the M RMOS.

16. The beam steering system according to claim 15, wherein the RPM is further comprised of an optical combiner coupled to each ROC and configured to combine the M RMOS and thereby produce a single receive modulated optical carrier (RMOC) as an output.

17. The beam steering system according to claim 16, further comprising a photodetector configured to extract from the RMOC an RF signal.

18. The beam steering system according to claim 16, wherein the control processor is further configured to selectively independently control the phase difference applied in each of the M ROC to coordinate receive beam antenna steering.

19. The beam steering system according to claim 12, wherein at least one of the plurality of optical tuning elements is configured to selectively control an amplitude of the TMOS; and
wherein the control processor is further configured to selectively independently control the amplitude of each TMOS to coordinate antenna beam forming.

20. A method for controlling a phased array antenna system, comprising:
modulating M received RF signals from M antenna elements respectively onto M optical subcarriers to form M receive modulated optical subcarriers (RMOS), each comprised of a receive optical subcarrier signal and at least one receive optical sideband signal, where M is an integer value greater than 1;
processing one of the RMOS respectively in each of M receive optical channels (ROCs);
in each ROC, performing RF antenna beam steering operations by optical tuning the RMOS to selectively control a phase difference as between the receive optical subcarrier signal and the receive optical sideband signal; and
controlling a phase of the receive optical subcarrier signal in each of the M ROCs so as to match a phase of the receive optical subcarrier signal in each other of the M ROC.

21. The method according to claim 20, further comprising optically combining the M RMOS after matching the phases of the M RMOS so as to form a receive modulated optical carrier (RMOC).

22. The method according to claim 21, further comprising communicating the RMOC to a photodetector to extract a combined receive RF signal.

23. The method according to claim 22, further comprising performing RF antenna beam forming operations in each ROC by optically tuning the RMOS to selectively control an amplitude of the RMOS.

24. A method for controlling a phased array antenna system, comprising:
- modulating M received RF signals from M antenna elements respectively onto M optical subcarriers to form M receive modulated optical subcarriers (RMOS), each comprised of a receive optical subcarrier signal and at least one receive optical sideband signal, where M is an integer value greater than 1;
- processing one of the RMOS respectively in each of M receive optical channels (ROCs);
- in each ROC, performing RF antenna beam steering operations by optical tuning the RMOS to selectively control a phase difference as between the receive optical subcarrier signal and the receive optical sideband signal;
- receiving in each ROC a channel phase control signal applicable to a respective one of the RMOS, the phase control signal specifying a phase difference adjustment to be applied to the RMOS using the optical tuning; and
- optically combining the M RMOS after matching the phases of the M RMOS so as to form a receive modulated optical carrier (RMOC).

25. The method according to claim 24, further comprising selectively coordinating the phase difference that is applied to each of the M RMOS so as to control a boresight direction of a composite antenna receive beam produced by the M antenna elements.

* * * * *